United States Patent
Agarwal et al.

(10) Patent No.: US 7,919,555 B2
(45) Date of Patent: Apr. 5, 2011

(54) EPOXY COMPOSITIONS HAVING IMPROVED IMPACT RESISTANCE

(75) Inventors: Rajat Agarwal, Brighton, MI (US); Olaf Lammerschop, Krefeld (DE); Rainer Schoenfeld, Duesseldorf (DE); Hubert K. Schenkel, Sandhausen (DE); Barry N. Burns, Dublin (IE); Matthew J. Holloway, Kildare (IE); Mary B. Ward, Dublin (IE); Martin J. Fitzpatrick, Dublin (IE); Jonathan P. Wigham, Dublin (IE)

(73) Assignees: Henkel AG & Co. KGaA, Dusseldorf (DE); Loctite (R&D) Limited, Dublin (IE)

( * ) Notice: Subject to any disclaimer, the term of this patent is extended or adjusted under 35 U.S.C. 154(b) by 179 days.

(21) Appl. No.: 12/035,274

(22) Filed: Feb. 21, 2008

(65) Prior Publication Data

US 2008/0188609 A1 Aug. 7, 2008

Related U.S. Application Data

(63) Continuation of application No. PCT/US2006/033013, filed on Aug. 24, 2006.

(60) Provisional application No. 60/711,029, filed on Aug. 24, 2005, provisional application No. 60/760,941, filed on Jan. 23, 2006.

(51) Int. Cl.
  *C08L 63/02* (2006.01)
  *C08L 51/04* (2006.01)
(52) U.S. Cl. .................. 524/500; 524/504
(58) Field of Classification Search .......... 524/500, 524/504
  See application file for complete search history.

(56) References Cited

U.S. PATENT DOCUMENTS

| | | | |
|---|---|---|---|
| 4,340,716 A | 7/1982 | Hata et al. | |
| 4,702,962 A | 10/1987 | Kojo | |
| 5,006,611 A | 4/1991 | Schmid et al. | |
| 5,073,601 A | 12/1991 | Muelhaupt et al. | |
| 5,084,532 A | 1/1992 | Schenkel | |
| 5,202,390 A | 4/1993 | Muelhaupt et al. | |
| 5,278,257 A | 1/1994 | Muehaupt et al. | |
| 5,290,857 A | 3/1994 | Ashida et al. | |
| 5,637,179 A | 6/1997 | Nakayama et al. | |
| 5,686,509 A | 11/1997 | Nakayama et al. | |
| 5,789,482 A | 8/1998 | Eldin et al. | |
| 6,015,865 A | 1/2000 | Blank et al. | |
| 6,037,392 A | 3/2000 | Tang et al. | |
| 6,111,015 A | 8/2000 | Eldin et al. | |
| 6,180,693 B1 | 1/2001 | Tang et al. | |
| 6,573,309 B1 | 6/2003 | Reitenbach et al. | |
| 6,776,869 B1 | 8/2004 | Schenkel | |
| 6,884,854 B2 | 4/2005 | Schoenfeld et al. | |
| 6,998,011 B2 | 2/2006 | Schoenfeld et al. | |
| 2003/0125423 A1* | 7/2003 | George et al. | 523/400 |
| 2003/0187154 A1 | 10/2003 | Schoenfeld et al. | |
| 2004/0039084 A1* | 2/2004 | Beisele | 523/201 |
| 2004/0181013 A1 | 9/2004 | Schenkel | |
| 2004/0266899 A1 | 12/2004 | Muenz et al. | |
| 2005/0022929 A1 | 2/2005 | Schoenfeld et al. | |
| 2005/0070634 A1 | 3/2005 | Lutz et al. | |
| 2005/0129955 A1 | 6/2005 | Schoenfeld et al. | |
| 2005/0159511 A1 | 7/2005 | Kramer | |
| 2005/0209401 A1 | 9/2005 | Lutz et al. | |
| 2005/0215730 A1 | 9/2005 | Schoenfeld et al. | |
| 2006/0276601 A1 | 12/2006 | Lutz et al. | |
| 2007/0066721 A1 | 3/2007 | Kramer et al. | |
| 2007/0105983 A1 | 5/2007 | Kramer et al. | |
| 2007/0251419 A1 | 11/2007 | Yamaguchi et al. | |
| 2008/0029200 A1 | 2/2008 | Sheasley | |

FOREIGN PATENT DOCUMENTS

| | | |
|---|---|---|
| CA | 2518618 | 1/2005 |
| CA | 2532215 | 1/2005 |
| CA | 1330143 | 6/2005 |
| EP | 1602702 | 12/2005 |
| EP | 1632533 | 3/2006 |
| EP | 1728825 | 12/2006 |
| JP | 06-287411 A | 10/1994 |
| JP | 09-095599 A | 4/1997 |
| JP | 11-172076 A | 6/1999 |
| JP | 2003-277579 A | 10/2003 |
| JP | 2005-255822 | 9/2005 |

OTHER PUBLICATIONS

International Search Report.
JP 58-069265 (abstract).
JP 58-063758 (abstract).
"The Nerxt Kaneka", pub. date unknown; www.Kaneka.com Feb. 11, 2008.
Kunststoffe plast Europe, Dec. 2004; "Tough and Heat-resistant: New Silicone Particles for Thermosets".

* cited by examiner

*Primary Examiner* — Robert D. Harlan
(74) *Attorney, Agent, or Firm* — Steven C. Bauman

(57) ABSTRACT

This invention relates to compositions useful as adhesives and more particularly to the preparation of heat-cured epoxy-based adhesive compositions with improved impact resistance and good adhesion to oily metal substrates.

10 Claims, No Drawings

EPOXY COMPOSITIONS HAVING IMPROVED IMPACT RESISTANCE

CROSS-REFERENCE TO RELATED APPLICATIONS

This application is a continuation under 35 USC Sections 365(c) and 120 of International Application No. PCT/US2006/033013 filed 24 Aug. 2006 and published 1 Mar. 2007 in English as WO 2007/025007, which claims priority from U.S. Provisional Application No. 60/711,029, filed 24 Aug. 2005, and U.S. Provisional Application No. 60/760,941, filed 23 Jan. 2006, each of which is incorporated herein by reference in its entirety.

BACKGROUND OF THE INVENTION

1. Field of the Invention

This invention relates to compositions useful as adhesives and more particularly to the preparation of epoxy-based adhesive compositions with improved impact resistance and/or good adhesion to oily metal substrates.

2. Brief Discussion of the Related Art

Numerous compositions and processes are described in the art for making and using a wide variety of epoxy-based compositions and other resins and additives in an effort to improve the expansion, impact resistance and other key properties of adhesives useful in adhering, filling and making composite structures. For example, patents which describe components for the formulation of adhesive compositions and the use of such compositions to adhere various substrates to each other and to provide structural reinforcement include U.S. Pat. Nos. 5,290,857, 5,686,509, 5,334,654, 6,015,865, 5,278,257, 6,884,854, and 6,776,869 and U.S. Patent Application Publication No. 2005-0022929. Nevertheless, significant problems remain with respect to the preparation of high impact epoxy-based adhesives such as poor retention of peel strength and impact peel performance at low temperatures and poor adhesion to oily metal surfaces.

SUMMARY OF THE INVENTION

We have discovered that unexpectedly improved adhesive formulations can be prepared by admixing rubber particles having a core-shell structure, at least one auxiliary impact modifier/toughening agent (such as an epoxy-based prepolymer obtained by reacting an epoxy resin with an amine-terminated polyether), additional epoxy resin, a latent curing agent capable of being activated by heat, and, optionally, fillers (especially platy fillers and/or hollow glass microspheres), thixotropic agents, coloring agents, expanding (blowing) agents, or other adjuvants of the type known in the art. When applied to a substrate or carrier and cured by heating, the adhesive results in a product having improved impact toughness and/or impact resistance and improved retention of peel strength at low temperatures useful in a wide variety of applications. In one embodiment of the invention, the adhesion of the cured adhesive to an oily substrate is enhanced by additionally including a reaction product of an epoxy resin and a compound containing chelating functionality.

DETAILED DESCRIPTION OF CERTAIN EMBODIMENTS OF THE INVENTION

Epoxy Resins

In general, a large number of polyepoxides having at least about two 1,2-epoxy groups per molecule are suitable as epoxy resins for the compositions of this invention. The polyepoxides may be saturated, unsaturated, cyclic or acyclic, aliphatic, alicyclic, aromatic or heterocyclic polyepoxide compounds. Examples of suitable polyepoxides include the polyglycidyl ethers, which are prepared by reaction of epichlorohydrin or epibromohydrin with a polyphenol in the presence of alkali. Suitable polyphenols therefor are, for example, resorcinol, pyrocatechol, hydroquinone, bisphenol A (bis(4-hydroxyphenyl)-2,2-propane), bisphenol F (bis(4-hydroxyphenyl)methane), bis(4-hydroxyphenyl)-1,1-isobutane, 4,4'-dihydroxybenzophenone, bis(4-hydroxyphenyl)-1,1-ethane, and 1,5-hydroxynaphthalene. Other suitable polyphenols as the basis for the polyglycidyl ethers are the known condensation products of phenol and formaldehyde or acetaldehyde of the novolak resin-type.

Other polyepoxides that are in principle suitable are the polyglycidyl ethers of polyalcohols or diamines. Such polyglycidyl ethers are derived from polyalcohols, such as ethylene glycol, diethylene glycol, triethylene glycol, 1,2-propylene glycol, 1,4-butylene glycol, triethylene glycol, 1,5-pentanediol, 1,6-hexanediol or trimethylolpropane.

Other polyepoxides are polyglycidyl esters of polycarboxylic acids, for example, reaction products of glycidol or epichlorohydrin with aliphatic or aromatic polycarboxylic acids, such as oxalic acid, succinic acid, glutaric acid, terephthalic acid or a dimeric fatty acid.

Other epoxides are derived from the epoxidation products of olefinically-unsaturated cycloaliphatic compounds or from natural oils and fats.

Particular preference is given to the liquid epoxy resins derived by reaction of bisphenol A or bisphenol F and epichlorohydrin. The epoxy resins that are liquid at room temperature generally have epoxy equivalent weights of from 150 to about 480.

The epoxy resins that are solid at room temperature may also or alternatively be used and are likewise obtainable from polyphenols and epichlorohydrin; particular preference is given to those based on bisphenol A or bisphenol F having a melting point of from 45 to 130° C., preferably from 50 to 80° C. They differ from the liquid epoxy resins substantially by the higher molecular weight thereof, as a result of which they become solid at room temperature. The solid epoxy resins generally have an epoxy equivalent weight of $\geq 400$.

Typically, the composition may contain from about 25 to about 55 weight percent (in one embodiment, from about 30 to about 50 weight percent) of epoxy resin (unless otherwise stated, all concentrations set forth herein are expressed in terms of the weight percent of the component in question based on the adhesive composition as a whole).

Core-Shell Rubber Particles

Rubber particles having a core-shell structure are an additional component of the compositions of the present invention. Such particles generally have a core comprised of a polymeric material having elastomeric or rubbery properties (i.e., a glass transition temperature less than about 0° C., e.g., less than about −30° C.) surrounded by a shell comprised of a non-elastomeric polymeric material (i.e., a thermoplastic or thermoset/crosslinked polymer having a glass transition temperature greater than ambient temperatures, e.g., greater than about 50° C.). For example, the core may be comprised of a diene homopolymer or copolymer (for example, a homopolymer of butadiene or isoprene, a copolymer of butadiene or isoprene with one or more ethylenically unsaturated monomers such as vinyl aromatic monomers, (meth)acrylonitrile, (meth)acrylates, or the like) while the shell may be comprised of a polymer or copolymer of one or more monomers such as (meth)acrylates (e.g., methyl methacrylate), vinyl aromatic monomers (e.g., styrene), vinyl cyanides (e.g., acrylonitrile), unsaturated acids and anhydrides (e.g., acrylic acid), (meth) acrylamides, and the like having a suitably high glass transition temperature. The polymer or copolymer used in the shell may have acid groups that are crosslinked ionically through metal carboxylate formation (e.g., by forming salts of divalent metal cations). The shell polymer or copolymer could also be covalently crosslinked through the use of monomers having two or more double bonds per molecule. Other rubbery polymers may also be suitably be used for the core, including polybutylacrylate or polysiloxane elastomer (e.g., polydimethylsiloxane, particularly crosslinked polydimethylsiloxane). The rubber particle may be comprised of more than two layers (e.g., a central core of one rubbery material may be surrounded by a second core of a different rubbery material or the rubbery core may be surrounded by two shells of different composition or the rubber particle may have the structure soft core, hard shell, soft shell, hard shell). In one embodiment of the invention, the rubber particles used are comprised of a core and at least two concentric shells having different chemical compositions and/or properties. Either the core or the shell or both the core and the shell may be crosslinked (e.g., ionically or covalently), as described, for example, in U.S. Pat. No. 5,686,509 (incorporated herein by reference in its entirety). The shell may be grafted onto the core. The polymer comprising the shell may bear one or more different types of functional groups (e.g., epoxy groups, carboxylic acid groups) that are capable of interacting with other components of the compositions of the present invention. In other embodiments, though, the shell is free of functional groups capable of reacting with other components present in the composition.

Typically, the core will comprise from about 50 to about 95 percent by weight of the rubber particles while the shell will comprise from about 5 to about 50 percent by weight of the rubber particles.

Preferably, the rubber particles are relatively small in size. For example, the average particle size may be from about 0.03 to about 2 microns or from about 0.05 to about 1 micron. In certain embodiments of the invention, the rubber particles have an average diameter of less than about 500 nm. In other embodiments, the average particle size is less than about 200 nm. For example, the core-shell rubber particles may have an average diameter within the range of from about 25 to about 200 nm or from about 50 to about 150 nm.

Methods of preparing rubber particles having a core-shell structure are well-known in the art and are described, for example, in U.S. Pat. Nos. 3,985,703, 4,180,529, 4,315,085, 4,419,496, 4,778,851, 5,223,586, 5,290,857, 5,534,594, 5,686,509, 5,789,482, 5,981,659, 6,111,015, 6,147,142 and 6,180,693, 6,331,580 and published U.S. application 2005-124761, each of which is incorporated herein by reference in its entirety. Rubber particles having a core-shell structure are also available from several commercial sources. The following core-shell rubbers are suitable for use in the present invention, for example: the core-shell particles available in powder form from Wacker Chemie under the tradename GENIOPERL, including GENIOPERL P22, P23, P52 and P53, which are described by the supplier as having crosslinked polysiloxane cores, epoxy-functionalized polymethylmethacrylate shells, polysiloxane content of about 65 weight percent, softening points as measured by DSC/DMTA of about 120 degrees C., and a primary particle size of about 100 nm, the core-shell rubber particles available from Rohm & Haas under the tradename PARALOID, in particular the PARALOID EXL 2600/3600 series of products, which are grafted polymers containing a polybutadiene core upon which is grafted a styrene/methylmethacrylate copolymer and having an average particle size of ca. 0.1 to about 0.3 microns; the core-shell rubber particles sold under the tradename DEGALAN by Roehm GmbH or Roehm America, Inc. (e.g., DEGALAN 4899F, which is reported to have a glass transition temperature of about 95° C.); the core-shell rubber particles sold by Nippon Zeon under the tradename F351; and the core-shell rubber particles sold by General Electric under the tradename BLENDEX.

Rubber particles having a core-shell structure may be prepared as a masterbatch where the rubber particles are dispersed in one or more epoxy resins such as a diglycidyl ether of bisphenol A. For example, the rubber particles typically are prepared as aqueous dispersions or emulsions. Such dispersions or emulsions may be combined with the desired epoxy resin or mixture of epoxy resins and the water and other volatile substances removed by distillation or the like. One method of preparing such masterbatches is described in more detail in European Patent Application EP 1632533, incorporated herein by reference in its entirety. For example, an aqueous latex of rubber particles may be brought into contact with an organic medium having partial solubility in water and then with another organic medium having lower partial solubility in water than the first organic medium to separate the water and to provide a dispersion of the rubber particles in the second organic medium. This dispersion may then be mixed with the desired epoxy resin(s) and volatile substances removed by distillation or the like to provide the masterbatch. Other methods for preparing masterbatches of rubber particles having a core-shell structure stably dispersed in an epoxy resin matrix are described in U.S. Pat. Nos. 4,778,851 and 6,111,015, each incorporated herein by reference in its entirety. Preferably, the rubber particles are stably dispersed in the epoxy resin matrix, i.e., the core-shell rubber particles remain as separated individual particles with little or no agglomeration of the particles or precipitation (settling) of the particles from the masterbatch as the masterbatch is aged by standing at room temperature. The shell of the rubber particles may advantageously be functionalized to improve the stability of the masterbatch, although in another embodiment the shell is non-functionalized (i.e., does not contain any functional groups that react with any of the other components of the adhesive composition (such as the epoxy resin or curing agent) when that composition is cured).

Particularly suitable dispersions of rubber particles having a core-shell structure in an epoxy resin matrix are available from Kaneka Corporation.

For instance, the core may be formed predominantly from feed stocks of dienes such as butadiene, (meth)acrylates, ethylenically unsaturated nitriles such as acrylonitrile, and/or any other monomers that when polymerized or copolymerized yield a polymer or copolymer having a low glass transition temperature. The outer shells may be formed predominantly from feed stocks of (meth)acrylates such as methylmethacrylate, vinyl aromatic monomers such as styrene and/or ethylenically unsaturated halocarbons such as vinyl chloride and/or any other monomers that when polymerized or copolymerized yield a polymer having a higher glass transition temperature.

The core shell rubber may have an average particle size in the range of 0.07 to 10 microns, such as 0.1 to 5 microns or 0.1 to 10 microns or 0.2 to 2 microns.

The core shell rubber made in this way may be dispersed in an epoxy matrix or a phenolic matrix. Examples of epoxy matrices include the diglycidyl ethers of bisphenol A, F or S, or bisphenol, novalac epoxies, and cycloaliphatic epoxies. Examples of phenolic resins include bisphenol-A based phenoxies.

The polymer constituting the rubber particle core preferably is an elastic material comprised of (in polymerized form) not less than 50% by weight of at least one monomer selected from the group consisting of a diene monomer (conjugated diene monomer) and a (meth)acrylate monomer and less than 50% by weight of another copolymerizable vinyl monomer. In the present invention, (meth)acrylate means acrylate and/or methacrylate.

Suitable conjugated diene monomers include, for example, butadiene, isoprene, chloroprene, and the like, among which butadiene is particularly preferable. The (meth)acrylate monomers may include, for example, butyl acrylate, 2-ethylhexyl acrylate, lauryl methacrylate, and the like, among which butyl acrylate and 2-ethylhexyl acrylate are particularly preferable. These can be used alone or as a mixture of two or more thereof.

The total amount of conjugated diene monomer and/or (meth)acrylate monomer is preferably not less than 50% by weight, more preferably not less than 60% by weight, based on the total weight of the monomers used to make the core polymer.

The core polymer may be comprised not only of conjugated diene monomer(s) and/or (meth)acrylate monomers but also one or more vinyl monomers copolymerizable therewith. The vinyl monomers copolymerizable with the conjugated diene monomer or (meth) acrylate monomer include, but are not limited to, monomers selected from the group consisting of aromatic vinyl monomers and vinyl cyanide monomers. Suitable aromatic vinyl monomers include, for example, styrene, α-methylstyrene and vinyl naphthalene, and suitable vinyl cyanide monomers include, for example, acrylonitrile, methacrylonitrile and other substituted acrylonitriles. These can be used alone or in combination thereof.

The amount of these copolymerizable vinyl monomers used is preferably less than 50% by weight, more preferably less than 40% by weight, based on the total weight of the monomers used to prepare the core polymer.

To adjust the degree of crosslinkage, a multifunctional monomer may be contained as a component in the synthesis of the core copolymer. Examples of multifunctional monomers include compounds containing two or more carbon-carbon double bonds such as divinyl benzene, butane diol di(meth)acrylate, triallyl(iso)cyanurate, allyl(meth)acrylate, diallyl itaconate, diallyl phthalate, and the like. The amount of the multifunctional monomer used is typically not higher than 10% by weight, preferably not higher than 5% by weight, more preferably not higher than 3% by weight, based on the total weight of the monomers used to prepare the core polymer.

To adjust the molecular weight of the core polymer or the extent to which the core polymer is crosslinked, a chain transfer agent may be used. For example, C5 to C20 alkyl mercaptans can be used for this purpose. The amount of the chain transfer agent used is typically not higher than 5% by weight, more preferably not higher than 3% by weight, based on the total weight of the core polymer monomers.

As mentioned previously, polysiloxane rubbers can be employed as the core polymer in the core-shell rubber particles, either alone or in combination with other core polymers. The polysiloxane may, for example, be comprised of di-alkyl or aryl substituted silyloxy units such as dimethyl silyloxy, methylphenyl silyloxy and diphenyl silyloxy. It may be preferable to introduce a crosslinked structure into the polysiloxane by using a multifunctional alkoxy silane compound partially in combination therewith during polymerization or by radically reacting a silane compound having a vinyl reactive group introduced in it or using other methods, if necessary.

Preferably, the composition of the polymer used for the shell layer has sufficient affinity for epoxy resin such that the resulting rubber-like core-shell particles can be dispersed stably in the form of primary particles in the epoxy resin.

The polymer comprising the shell layer preferably has been graft-polymerized with and substantially bonded to the polymer constituting the rubber particle core. It is desired that preferably not less than 70% by weight, more preferably not less than 80% by weight and still more preferably not less than 90% by weight of the polymer constituting the shell layer is covalently bonded to the polymer comprising the particle core.

The shell layer polymer may contain moieties or units derived from monomers reactive with the epoxy resin or with a curing agent. A functional group of the reactive monomer contained in the shell layer polymer is preferably one capable of chemically reacting with the epoxy resin or the curing agent present in the adhesive compositions of the present invention.

The polymer constituting the shell layer is preferably a polymer or copolymer obtained by copolymerizing at least one component selected from alkyl (meth)acrylates, aromatic vinyl compounds and vinyl cyanide compounds. Particularly when the shell layer is desired to be chemically reactive at the time of curing the adhesive composition, it is preferable from the viewpoint of high reactivity with the epoxy group or the epoxy curing agent that the polymer constituting the shell layer contain at least one monomer selected from the group consisting of (meth)acrylates having a reactive group, such as hydroxyalkyl (meth)acrylates, aminoalkyl (meth)acrylates, epoxyalkyl (meth)acrylates, epoxy alkyl vinyl ethers, unsaturated acid derivatives, (meth)acrylamide derivatives and maleimide derivatives, in addition to the alkyl (meth)acrylate(s), aromatic vinyl compound(s) and/or vinyl cyanide compound(s).

Suitable alkyl (meth)acrylates include, for example, methyl (meth)acrylate, ethyl (meth)acrylate, butyl (meth)acrylate, 2-ethylhexyl (meth)acrylate, and the like. The aromatic vinyl monomers that are suitable include styrene, α-methylstyrene, and the like. Suitable vinyl cyanides include (meth)acrylonitrile and the like.

(Meth)acrylates having reactive groups include, for example, 2-hydroxyethyl (meth)acrylate, 2-aminoethyl (meth)acrylate and glycidyl (meth)acrylate. Suitable epoxy alkyl vinyl ethers include glycidyl vinyl ether. Suitable unsaturated acid derivatives include α,β-unsaturated acids, α,β-unsaturated acid anhydrides, (meth)acrylic acid, itaconic acid and crotonic acid. The (meth)acrylamide derivatives that are suitable include (meth)acrylamide (including N-substituted derivatives thereof). Suitable maleimide derivatives include maleic imide. These can be used alone or in combination thereof.

The ratio (by weight) of the core layer:shell layer in the rubber particles is in the range of preferably 50:50 to 95:5, more preferably 60:40 to 90:10.

The rubber particles having a core-shell structure can be produced by any method known in the art, such as emulsion polymerization, suspension polymerization, micro-suspension polymerization and the like. In particular, a process involving emulsion polymerization is preferred.

In the embodiment of the invention where the core-shell rubber particles are to be introduced into the adhesive composition in the form of a masterbatch in epoxy resin, the concentration of the rubber particles is not particularly limited. The epoxy resin(s) used to prepare the materbatch may be the same as, or different from, the epoxy resin(s) introduced separately into the composition. In one embodiment, all of the epoxy resin of the adhesive composition of the present invention is introduced in the form of a masterbatch together with the core-shell rubber particles. Assuming that the total amount of the epoxy resin and rubber particles in the masterbatch is 100% by weight, the content of the core-shell particles may be, for example, 0.5 to 80% by weight, preferably 1 to 70% by weight, more preferably 3 to 60% by weight, still more preferably 20 to 40% by weight.

In the inventive formulations, use of these core shell rubbers allows for toughening to occur in the formulation, irrespective of the temperature or temperatures used to cure the formulation. That is, because of the two phase separation inherent in the formulation due to the core shell rubber—as contrasted for instance with a liquid rubber that is miscible or partially miscible or even immiscible in the formulation and can solidify at temperatures different than those used to cure the formulation—there is a minimum disruption of the matrix properties, as the phase separation in the formulation is often observed to be substantially uniform in nature.

In addition, predictable toughening—in terms of temperature neutrality toward cure—may be achieved because of the substantial uniform dispersion.

Many of the core-shell rubber structures available from Kaneka in the form of phase separated particles dispersed in epoxy resin are believed to have a core made from a copolymer of (meth)acrylate-butadiene-styrene, where butadiene is the primary component of the copolymer in the core. Other commercially available masterbatches of core-shell rubber particles dispersed in epoxy resins include GENIOPERL M23A (a dispersion of 30 weight percent core-shell particles in an aromatic epoxy resin based on bisphenol A diglycidyl ether; the core-shell particles have an average diameter of ca. 100 nm and contain a crosslinked silicone elastomer core onto which an epoxy-functional acrylate copolymer has been grafted; the silicone elastomer core represents about 65 weight percent of the core-shell particle), available from Wacker Chemie GmbH.

Typically, the adhesive composition may contain from about 5 to about 25 weight percent (in one embodiment, from about 8 to about 20 weight percent) rubber particles having a core-shell structure. Combinations of different core-shell rubber particles may advantageously be used in the present invention. The core-shell rubber particles may differ, for example, in particle size, the glass transition temperatures of their respective cores and/or shells, the compositions of the polymers used in their respective cores and/or shells, the functionalization of their respective shells, and so forth. A portion of the core-shell particles may be supplied to the adhesive composition in the form of a masterbatch wherein the particles are stably dispersed in an epoxy resin matrix and another portion may be supplied to the adhesive composition in the form of a dry powder (i.e., without any epoxy resin or other matrix material). For example, the adhesive composition may be prepared using both a first type of core-shell particles in dry powder form having an average particle diameter of from about 0.1 to about 10 microns (more preferably, from about 0.2 to about 2 microns) and a second type of core-shell particles stably dispersed in a matrix of liquid bisphenol A diglycidyl ether at a concentration of from about 5 to about 50 weight % and having an average particle diameter of from about 25 to about 200 nm. The weight ratio of first type:second type core-shell rubber particles may be from about 1.5:1 to about 0.3:1, for example. The core-shell rubber sold by Nippon Zeon under the trade name F351 may, for example, be utilized as the first type of core-shell rubber particles and the core-shell rubbers sold by Kaneka Corporation under the trade names ACE MX120 and ACE MX156 may, for example, be utilized as the source of the second type of core-shell rubber particles.

Typically, the weight ratio of epoxy resin:combined weight of auxiliary impact modifier/toughening agent (e.g., epoxy-based prepolymer) and rubber particles having a core-shell structure is not less than about 0.2:1 and not more than about 3:1 (e.g., from about 0.5:1 to about 2.5:1 or from about 0.5:1 to about 2:1 or from about 0.5:1 to about 1.5:1).

The weight ratio of auxiliary impact modifier/toughening agent (e.g., epoxy-based prepolymer):rubber particles is typically not less than about 0.2:1 and not more than about 5:1 (e.g., from about 0.5:1 to about 3:1 or from about 1:1 to about 3:1 or from about 0.5:1 to about 2:1).

Auxiliary Impact Modifiers/Toughening Agents

It has been unexpectedly discovered that the impact properties of cured compositions containing epoxy resin and the aforedescribed core-shell rubber particles, especially at relatively low temperatures, may often be significantly improved by incorporating into such compositions one or more auxiliary impact modifiers and/or toughening agents that do not have a core-shell structure. Such improvements generally cannot be realized simply by increasing the amount of core-shell rubber particles or by varying the composition or other characteristics of the core-shell rubber particles.

Suitable auxiliary impact modifiers/toughening agents may be selected from a wide variety of substances, but generally speaking such materials are polymeric or oligomeric in character, have glass transition temperatures below 20° C. (more preferably below 0° C. or below −30° C. or below −50° C.), and have functional groups such as epoxy groups, carboxylic acid groups, amino groups and/or hydroxyl groups capable of reacting with the other components of the compositions of the present invention when the composition is cured by heating (although alternatively the auxiliary impact modifier/toughening agent may be free of such reactive functional groups).

The epoxy-based prepolymers (sometimes described herein as "adducts") obtained by reacting one or more amine-terminated polymers such as amine-terminated polyethers and amino silane-terminated polymers with one or more epoxy resins represent a particularly preferred class of auxiliary impact modifiers/toughening agents. The epoxy resins useful for such purpose may be selected from among the epoxy resins described hereinabove, with particular preference being given to the diglycidyl ethers of polyphenols such as bisphenol A and bisphenol F (for example, having epoxy equivalent weights of from about 150 to about 1000). Mixtures of solid and liquid epoxy resins may be suitably employed.

The preparation of such epoxy-based prepolymers from amine-terminated polyethers is well known in the art and is described, for example, in U.S. Pat. Nos. 5,084,532 and 6,015,865, each of which is incorporated herein by reference in its entirety. Generally speaking, it will often be desirable to adjust the ratio of amine-terminated polyether:epoxy resin being reacted such that there is an excess of epoxy groups relative to amine groups such that the latter functional groups are completely reacted (i.e., the epoxy-based prepolymer contains essentially no free amine groups).

Mixtures of di- and trifunctional amine-terminated polyethers may be used. Amine-terminated polyethers containing both oxyethylene and oxypropylene repeating units (e.g., copolymers of ethylene oxide and propylene oxide, with the copolymers having a block, capped or random structure) may also be utilized as the amino-terminated polyether. Preferably, the amino-terminated polyether contains at least two amine groups per molecule. Preferably, the amine groups are primary amine groups. The amino-terminated polyether is preferably aliphatic.

When reacting the epoxy resins with the amine-terminated polyether, an excess of epoxy groups over the amino groups is preferably used so that the latter react completely with epoxide groups. Typically, there is a 1.5 to 10-fold excess, for example a 3.5-fold excess of epoxy groups over the active hydrogen equivalents (AHEW) of the amine-terminated polyether. In preparing the composition according to the present invention, the epoxy-based prepolymer component preferably is initially prepared in a first stage. To this end, preferably, the epoxy resins are reacted with the amine-terminated polyether c) in the desired ratio. The reaction preferably is carried out at high temperature, preferably at 90 to 130° C., for example at approximately 120° C., for a duration of, e.g., three hours.

In the preparation of the epoxy-based prepolymer, the following compounds may, for example, be used:

1. linear amine-terminated polyoxyethylene ethers having the formula:

$$H_2N-(CH_2)_2-[O-(CH_2)_2-O-(CH_2)_2]_n-NH_2$$

in which n preferably is 17 to 27.

2. linear amine-terminated polyoxypropylene ethers having the formula:

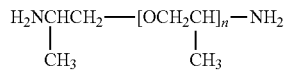

or isomers thereof, in which n preferably is 5 to 100. They are obtainable from Huntsman Chemical under the trade name JEFFAMINE® (D-series). The number average molecular weight of such amine-terminated polyoxypropylene ethers may vary, for example, from about 300 to about 5000.

3. trifunctional compounds having the formula:

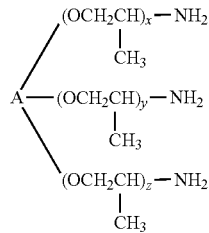

in which A is

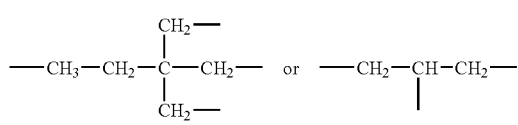

and x, y and z independently of each other are 1 to 40 and x+y+z is preferably >6. Representative examples of these trifunctional compounds are available commercially from Huntsman Chemical under the trade name Jeffamine® (T-series). Such substances typically have number average molecular weights of from about 300 to about 6000.

4. amino silane capped polymers, such as those may be embraced by:

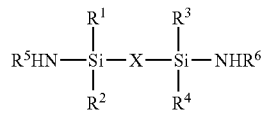

where $R^1$, $R^2$, $R^3$ and $R^4$ may be the same or different and are selected from hydrogen, hydroxyl, alkyl, alkoxy, alkenyl, alkenyloxy, aryl, and aryloxy; $R^5$ and $R^6$ may be the same or different and are selected from hydrogen, alkyl and aryl; and X is selected from alkylene, alkenylene, arylene, with or without interruption by a heteroatom; polyurethanes; polyethers; polyesters; polyacrylates; polyamides; polydienes; polysiloxanes; and polyimides.

For instance, amine-terminated siloxanes may be used, such as diamino siloxanes embraced by:

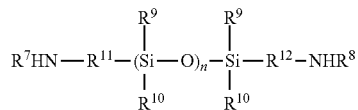

where $R^{11}$ and $R^{12}$ may be the same or different and are selected from alkylene, arylene, alkylene oxide, arylene oxide, alkylene esters, arlyene esters, alkylene amides or arylene amides; $R^9$ and $R^{10}$ may be the same or different and are selected from alkyl or aryl; $R^7$ and $R^8$ are as defined above and n is 1-1,200.

Certain amino-modified silicone fluids that are commercially available from Shin-Etsu under the trade designations KF857, KF858, KF859, KF861, KF864 and KF880 may be useful herein. In addition, Wacker Silicones offers commercially a line of amino-functional silicone fluids designated as L650, L651, L653, L654, L655 and L656, and an amino-functional polydimethylsiloxane under the tradename WACKER FINISH WR 1600 that may be useful herein.

Other amino-functionalized silanes or siloxanes useful in forming the adduct include materials available for purchase from Degussa's Sivento division, such as a proprietary aminofunctional silane composition (called DYNASYLAN® 1126), an oligomeric diaminosilane system (called DYNASYLAN® 1146), N-vinylbenzyl-N'-aminoethyl-e-aminopropylpolysiloxane (DYNASYLAN® 1175), N-(n-butyl)-3-aminopropyltrimethoxysilane (DYNASYLAN® 1189), a proprietary aminofunctional silane composition (called DYNASYLAN® 1204), N-(2-aminoethyl)-3-aminopropyl-methyldimethoxysilane (DYNASYLAN® 1411), 3-aminopropylmethyldiethoxysilane (DYNASYLAN® 1505), 3-aminopropylmethyldiethoxysilane (DYNASYLAN® 1506), 3-aminopropyltriethoxysilane (DYNASYLAN® AMEO), a proprietary aminosilane composition (called DYNASYLAN® AMEO-T), 3-aminopropyltrimethoxysilane (DYNASYLAN® AMMO), N-2-aminoethyl-3-aminopropyltrimethoxysilane (DYNASYLAN® DAMO), N-(2-aminoethyl)-3-aminopropyltrimethoxysilane (DYNASYLAN® DAMO-T) and a triamino-functional propyltrimethoxysilane (called DYNASYLAN® TRIAMO).

In another particularly preferred embodiment of the invention, one or more polyurethanes (the term "polyurethanes" as used herein includes polyureas, polyurea-urethanes, as well as polyurethanes) are used as auxiliary impact modifier/toughening agents. Suitable polyurethanes include the reaction products of a) isocyanate-terminated prepolymers and b) hydroxyl-containing epoxides and/or compounds having one or more phenolic, benzyl alcohol, aminophenyl or benzylamino groups per molecule (such as those described in U.S. Pat. Nos. 5,278,257 and 6,776,869, published U.S. application 2005-070634, and published Canadian applications 2,510,486 and 2,532,215, each of which is incorporated herein by reference in its entirety).

Particularly preferred polyurethanes include phenol-terminated polyurethanes, polyureas and polyurea-urethanes of the formula:

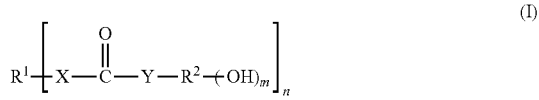

(I)

in which m is 1 or 2, n is 2 to 6, $R^1$ is the n-valent radical of an elastomeric prepolymer, after the removal of the terminal isocyanate, amino or hydroxyl groups, which is soluble or dispersible in epoxide resins (e.g., an amino-, thiol- or hydroxyl-terminated polyoxyalkylene such as polypropylene glycol or polytetrahydrofuran diol), X and Y independently of one another are —O— or —$NR^3$—, it being necessary for at least one of these groups to be —$NR^3$—, $R^2$ is an m+1-valent radical of a polyphenol or aminophenol after the removal of the phenolic hydroxy group(s) or the amino group or both the amino group and the phenolic hydroxyl group. respectively, and $R^3$ is hydrogen, C1-C6 alkyl or phenol. Such polyurethanes are known in the art and are described, for example, in U.S. Pat. No. 5,278,257, incorporated herein by reference in its entirety. Epoxy resin adducts of such polyurethanes may also be utilized as the auxiliary impact modifier/toughener in the present invention.

Another type of polyurethane found to be particularly effective as an auxiliary impact modifier/toughener in the compositions of the present invention is represented by the following formula:

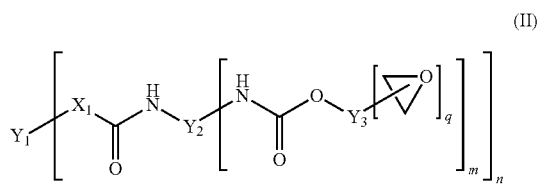

(II)

in which $X_1$ is O, S or NH; $Y_1$ is an n-valent radical of a reactive polymer (e.g., an amino-, thiol- or hydroxyl-terminated polyoxyalkylene such as polypropylene glycol or polytetrahydrofuran diol) after removal of the terminal amino, thiol or hydroxyl groups; $Y_2$ is a divalent radical of aliphatic, cycloaliphatic, aromatic or araliphatic diisocyanates after removal of the isocyanate groups or is a trivalent radical of trimers or biurets of aliphatic, cycloaliphatic, aromatic or araliphatic diisocyanates after removal of the isocyanate groups; $Y_3$ is a radical of an aliphatic, cycloaliphatic, aromatic or araliphatic epoxide containing a primary or secondary hydroxyl group after removal of the hydroxide and epoxide groups; q is 1, 2 or 3; m is 1 or 2; and n is 2, 3 or 4. Such polyurethanes are known in the art and are described, for example, in Canadian Pat. Application No. 2,510,486, incorporated herein by reference in its entirety.

Other tougheners or impact modifiers known in the epoxy adhesive art may be used in addition to, or as a substitute for, the aforementioned polyurethanes and epoxy-based prepolymers derived by reaction of amine-terminated polyethers or amino silane-terminated polymers with epoxy resins. Generally speaking, such tougheners and impact modifiers are characterized by having glass transition temperatures below about 0° C., preferably below about −30° C., even more preferably below about −50° C. Examples of such tougheners and impact modifiers include, but are not limited to: reaction products of epoxy-reactive copolymers of butadiene (especially epoxy-reactive copolymers of butadiene with relatively polar comonomers such as (meth)acrylonitrile, (meth)acrylic acid, or alkyl acrylates, e.g., carboxyl-terminated butadiene-nitrile rubbers, such as the products available commercially from Noveon under the trade name HYCAR) with epoxy resins (as described, for example, in U.S. Patent Application Publication No. US 2003/0196753 and U.S. Pat. No. 6,776,869, each of which being incorporated herein by reference in its entirety);

adducts of anhydrides (e.g., unsaturated anhydrides such as maleic anhydride) and diene polymers (e.g., liquid 1,4-cis polybutadienes), typically having number average molecular weights between about 1000 and about 5000, including for example, the adducts sold under the tradename POLYVEST by Degussa Corporation, as well as further reaction products of such adducts with epoxy resins;

polyesters, including, for example, amorphous, crystalline and/or semi-crystalline polyesters, including saturated polyesters, prepared by condensation of aliphatic and/or aromatic dicarboxylic acids (or the corresponding alkyl esters or anhydrides with diols having a chain length of C2 to C20, the polyesters being of medium molecular weight (e.g., about 1000 to about 20,000 number average molecular weight), such as the polyesters sold under the tradename DYNACOLL by Degussa Corporation, and including polyesters functionalized with carboxylic acid and/or hydroxyl endgroups, as well as adducts of such functionalized polyesters with epoxy resins;

adducts of dimeric fatty acids with epoxy resins (including, for example, the adducts sold under the tradename EPON 872 by Resolution Performance Products, the adducts sold under the tradename HYPOX DA323 (formerly ERISYS EMDA 3-23) by CVC Specialty Chemicals, as well as those adducts described in U.S. Pat. No. 5,218,063, incorporated herein by reference in its entirety);

adducts of hydroxyl-containing triglycerides (e.g., castor oil) with epoxy resins (including, for example, the adducts sold under the tradename HELOXY 505 by Resolution Performance Products);

adducts of polysulfides with epoxy resins (including, for example, the adducts sold under the tradename THIOPLAST EPS 350 by Akzo Nobel;

adducts of amine-terminated polydienes and diene copolymers with epoxy resins;

block copolymers, wherein at least one polymeric block of the copolymer has a glass transition temperature below 20° C. (preferably below 0° C. or below −30° C. or below −50° C.) such as a polybutadiene block or a polyisoprene block or hydrogenated derivative thereof and at least one polymeric block of the copolymer has a glass transition temperature above 20° C. (preferably above 50° C. or above 70° C.) such as a polystyrene block or a polymethylmethacrylate block, in particular block copolymers containing a polystyrene block, a 1,4-polybutadiene block (preferably having a glass transition temperature below about −60 degrees C.) and/or one or more polymethylmethacrylate blocks (preferably, having highly, i.e., >80%, syndiotactic structures), such as the SBM (styrene-butadiene-methylmethacrylate), MBM (methylmethacrylate-butadiene-methylmethacrylate) and BM (butadiene-methylmethacrylate) block copolymers made by living polymerization methods using nitroxide initiator (such as the methods described in U.S. Pat. Nos. 5,677,387, 5,686,534, and 5,886,112, each of which is incorporated herein by reference in its entirety) and sold under the tradename NANOSTRENGTH by Arkema and the block copolymers described in U.S. Pat. No. 6,894,113, incorporated herein by reference in its entirety;

carboxyl-functionalized adducts of amino- or hydroxyl-terminated polymers and carboxylic anhydrides, as well as further reaction products of such adducts with epoxy resins (such as those described in U.S. Pat. No. 6,884,854 and published U.S. application 2005-0215730, each of which is incorporated herein by reference in its entirety);

epoxy-terminated polyethers, such as polymers of alkylene oxides like ethylene oxide, propylene oxide or mixtures thereof that have been functionalized with epoxy groups, including by reacting the hydroxy groups of a polyalkylene glycol with epichlorohydrin;

phenol-terminated and aminophenyl-terminated products produced by reacting a stoichiometric excess of a carboxylic anhydride or dianhydride with a diamine or polyamine and then further reacting the excess carboxylic anhydride or carboxylic acid groups with at least one polyphenol or aminophenol, as described, for example, in published U.S. application 2004-0181013, incorporated herein by reference in its entirety.

Mixtures of different auxiliary impact modifiers/toughening agents may be used. The amount of auxiliary impact modifier/toughening agent in the curable compositions of the present invention may vary substantially but typically is from about 0.1 to about 40 weight percent, e.g. from about 5 to about 35 weight percent.

Typically, for example, the adhesive composition may contain from about 5 to about 40 weight percent (in one embodiment, from about 10 to about 35 weight percent) of epoxy-based prepolymer and/or polyurethane.

The cured composition made according to this invention is capable of exhibiting high T-peel and impact peel strengths in the temperature range of −40° C. to +90° C. In the cured state, these adhesives display the degree of flexibility that is necessary for many end-use applications especially in the manufacture of automobiles and trucks. The flexibility of the resin matrix may be adjusted, for example, by selecting an epoxy-based prepolymer prepared from amine-terminated polyether of varying functionality (di- or tri-functional) and variable chain-length, or by varying the ratio of amine-terminated polyether to epoxy resin in the preparation of the epoxy-based prepolymer. The impact properties of the cured adhesive, especially at low temperatures (e.g., less than about −20° C.) is markedly improved by using an epoxy-based prepolymer, polyurethane or other auxiliary impact modifier/toughener in combination with rubber particles having a core-shell structure.

Adhesion Promoters

To help improve adhesion of the cured adhesive to a substrate surface, especially a metallic substrate surface contaminated with oily substances as is commonly encountered in vehicle assembly operations, one or more reaction products of epoxy resins and compounds containing chelating functional groups (herein called "chelate-modified epoxy resins") may be added to the composition.

Such reaction products include those substances commonly referred to in the art as "chelate epoxies" or "chelating epoxy resins". The chelating functional groups include those functional groups capable of forming chelate bonds with divalent or polyvalent metal atoms, either by themselves or in cooperation with other functional groups positioned on the same molecule. Suitable chelating functional groups include, for example, phosphorus-containing acid groups (e.g., —PO(OH)$_2$), carboxylic acid groups (—CO$_2$H), sulfur-containing acid groups (e.g., —SO$_3$H), amino groups, and hydroxyl groups (particularly hydroxyl groups adjacent to each other on aromatic rings). The preparation of such reaction products may be carried out by methods known in the art such as, for example, those methods described in U.S. Pat. Nos. 4,702,962 and 4,340,716, European Patent No. EP 342 035 and Japanese Patent Document Nos. JP 58-063758 and JP 58-069265, each of which is incorporated herein by reference in its entirety. Reaction products of epoxy resins and compounds containing chelating functional groups are also available from commercial sources such as, for example, the ADEKA Resins EP-49-10N, EP-49-55C, EP-49-10, EP-49-20, EP-49-23, and EP-49-25 sold by Asahi Denka. Typically, the composition may contain from about 0.1 to about 3 weight percent of such chelate-modified epoxy resins.

Other compounds having metal chelating properties may also be used in the compositions of the present invention to help enhance the adhesion of the cured adhesive to a substrate surface, including, for example, the adhesion promoters described in U.S. Patent Application Publication No. 2005-0129955, incorporated herein by reference in its entirety. Also suitable for use as adhesion promoters are the acetoacetate-functionalized modifying resins sold by King Industries under the brand name K-FLEX XM-B301.

Curing Agents

Since the compositions of the present invention are preferably one-part or single-component compositions and are to be cured at elevated temperature, they also contain one or more curing agents (hardeners) capable of accomplishing cross-linking or curing of certain of the adhesive components when the adhesive is heated to a temperature well in excess of room temperature. That is, the hardener is activated by heating. The hardener may function in a catalytic manner or, in preferred embodiments of the invention, participate directly in the curing process by reaction with one or more of the adhesive components.

There may be used as thermally-activatable or latent hardeners for the adhesive compositions of the present invention, for example, guanidines, substituted guanidines, substituted ureas, melamine resins, guanamine derivatives, cyclic tertiary amines, aromatic amines and/or mixtures thereof. The hardeners may be involved stoichiometrically in the hardening reaction; they may, however, also be catalytically active. Examples of substituted guanidines are methylguanidine, dimethylguanidine, trimethylguanidine, tetra-methylguanidine, methylisobiguanidine, dimethylisobiguanidine, tetramethylisobiguanidine, hexamethylisobiguanidine, heptamethylisobiguanidine and, more especially, cyanoguanidine (dicyandiamide). Representatives of suitable guanamine derivatives which may be mentioned are alkylated benzoguanamine resins, benzoguanamine resins or methoxymethylethoxymethylbenzoguanamine.

For single-component, thermosetting adhesives, the selection criterion is, of course, the low solubility of those substances at room temperature in the resin system, so that solid, finely ground hardeners are preferred; dicyandiamide is especially suitable. Good storage stability of the composition is thereby ensured.

In addition to or instead of the above-mentioned hardeners, catalytically-active substituted ureas may be used. They are especially p-chlorophenyl-N,N-dimethylurea (monuron), 3-phenyl-1,1-dimethylurea (fenuron) or 3,4-dichlorophenyl-N,N-dimethylurea (diuron). In principle, catalytically active tertiary acryl- or alkyl-amines, such as benzyldimethylamine, tris(dimethylamino)phenol, piperidine or piperidine derivatives, may also be used, but they are in many cases too highly soluble in the adhesive system, so that usable storage stability of the single-component system is not achieved. Various imidazole derivatives, preferably solid imidazole derivatives, may also be used as catalytically-active accelerators. Examples which may be mentioned are 2-ethyl-2-methylimidazole, N-butylimidazole, benzimidazole and N—$C_1$ to $C_{12}$-alkylimidazoles or N-arylimidazoles. Particular preference is given to the use of a combination of hardener and accelerator in the form of so-called accelerated dicyandiamides in finely ground form. The separate addition of catalytically-active accelerators to the epoxy hardening system is thus not necessary.

The amount of curing agent utilized will depend upon a number of factors, including whether the curing agent acts as a catalyst or participates directly in crosslinking of the composition, the concentration of epoxy groups and other reactive groups in the composition, the desired curing rate and so forth. Typically, the composition contains from about 0.5 to about 8 weight percent curing agent(s).

Other Additives

The inventive compositions may also contain known fillers such as the various ground or precipitated chalks, quartz powder, alumina, dolomite, carbon fibers, glass fibers, polymeric fibers, titanium dioxide, fused silica, carbon black, calcium oxide, calcium magnesium carbonates, barite and, especially, silicate-like fillers of the aluminum magnesium calcium silicate type, for example wollastonite and chlorite. Typically, the compositions of the present invention may contain from about 0.5 to about 10 weight percent of fillers.

In one embodiment of the invention, the composition additionally contains one or more expanding agents (sometimes referred to in the art as blowing agents). The expandable properties of the resulting adhesive are particularly useful in applications where the complete filling of a gap or cavity in a part or member is critical in order to maintain maximum structural integrity of the part or member. The foamed cured adhesive has improved fracture toughness, thereby imparting impact resistance to the assembly. If the composition is to be utilized as a one-part or single-component composition, the expanding agent is preferably a latent expanding agent that causes expansion or foaming of the adhesive only when heated to a temperature significantly above room temperature (typically, a temperature which is in the range at which curing of the adhesive is also initiated). Although any suitable expanding agent may be employed, such as a chemical expanding agent, e.g., azo compounds, hydrazides and the like, particular preference is given to expandable microspheres. Expandable microspheres generally comprise small diameter polymeric shells or bubbles which encapsulate one or more volatile substances such as light hydrocarbons or halocarbons. The outer shells are usually thermoplastic in character to permit softening and expansion of the microspheres when heated due to volatilization of the substances trapped within the shells. The polymers used in the shells may be linear, branched, or cross-linked and may be comprised of, for example, acrylic resins, styrenic resins, polyvinylidene chloride, nitrile polymers, and the like. Typically, the average particle size of the expandable microspheres is in the range of from about 5 to about 100 microns. Suitable expandable microspheres are commercially available under the trademark names DUALITE and EXPANCEL from Henkel Corporation (formerly, Pierce & Stevens) and Casco Nobel, respectively.

In another embodiment, the composition additionally contains one or more platy fillers such as mica, talc or clay (e.g., kaolin). Preferably, the platy filler is muscovite mica in powder or ground form. The mica particles may, for example, have a relatively high aspect ratio (e.g., from about 5 to about 15), a bulk density of from about 10 to about 20 lb/ft$^3$, and/or a median particle diameter [D (V, 0.5), the size value of particles at which 50% of the sample is smaller and 50% is larger than this value, also known as the mass median diameter] of from about 10 to about 100 microns. Typically, the composition may contain from about 0.1 to about 3 weight percent mica.

In yet another embodiment, hollow glass microspheres are present in the composition. Commercially available hollow glass microspheres include the materials sold by Minnesota Mining & Manufacturing under the trademark SCOTCHLITE, with suitable grades including those available under the designations B38, C15, K20 and VS 5500. The glass microspheres preferably have diameters in the range of from about 5 to 200 micrometers and/or densities of from about 0.3 to about 0.5 g/cc. Typically, the composition may contain from about 0.5 to about 5 weight percent of hollow glass microspheres.

The adhesive compositions according to the present invention may also contain other common adjuvants and additives, such as plasticizers, reactive and/or non-reactive diluents, flow auxiliaries, coupling agents (e.g., silanes), adhesion promoters, wetting agents, tackifiers, flame retardants, thixotropic and/or rheology control agents (e.g., fumed silica, mixed mineral thixotropes), ageing and/or corrosion inhibitors, stabilizers and/or coloring pigments. Depending on the requirements made of the adhesive application with respect to its processing properties, its flexibility, the required rigidifying action and the adhesive bond to the substrates, the relative proportions of the individual components may vary within comparatively wide limits.

In one embodiment, the composition includes a reactive diluent such as a mono-epoxide (e.g., monoglycidyl ethers of alkyl- and alkenyl-substituted phenols). Typically, the composition may contain up to 15 weight percent (e.g., from about 0.5 to about 10 weight percent) reactive diluent.

Methods of Use

The inventive composition is suitable for adhering together parts made of different materials, including, for example, wood, metal, coated or pretreated metal, plastic, filled plastic, thermoset materials such as sheet molding compound and fiberglass and the like. The substrates to be joined using the adhesive may be the same as or different from each other. It is preferably used for the gluing of metal parts and particularly for the gluing of steel sheets such as cold rolled steel sheets. These can also be electro-galvanized, hot-dip galvanized, galvannealed and/or zinc/nickel-coated steel sheets, for example. The composition is especially useful for bonding substrates having surfaces contaminated with oily substances, as good adhesion is attained despite such contamination.

The inventive composition can be applied to a substrate surface by any technique known in the art. For example, it can be applied by extrusion from a robot in bead form onto the substrate or by mechanical application methods such as a caulking gun, or any other manual application means, and can also be applied using a swirl or streaming technique. The swirl and streaming techniques utilize equipment well known in the art such as pumps, control systems, dosing gun assemblies, remote dosing devices and application guns. Generally, the adhesive is applied to one or both of the substrates to be joined. The substrates are contacted such that the adhesive is located between the substrates to be bonded together. Thereafter, the adhesive composition is subjected to heating to a temperature at which the heat curable or latent curing agent initiates cure of the epoxy resin-containing composition.

The inventive composition may be deposited in the form of a melt on one side, i.e., onto one of the two parts that are to be adhered together. In one embodiment, the adhesive is formulated so as to function as a hot melt; that is, an adhesive which is solid at room temperature, but capable of being converted to a pumpable or flowable material when heated to a temperature above room temperature. In another embodiment, the composition of this invention is formulated to be capable of being flowed or pumped to the work site at ambient temperatures or slightly above since, in most applications, it is preferable to ensure that the adhesive is heated only up to a temperature at which the latent curing agent is not yet activated. The melted composition may be applied directly to the substrate surface or may be allowed to flow into a space separating the substrates to be joined, such as in a hem flanging operation. In yet another embodiment, the composition is formulated (by inclusion of a finely divided thermoplastic or by use of multiple curatives having different activation temperatures, for example) such that the curing process proceeds in two or more stages (partial curing at a first temperature, complete curing at a second, higher temperature). The two parts are joined together, preferably immediately after deposition of the adhesive mass, thereby provisionally bonding the two parts to each other.

The resultant bond preferably already has sufficient strength so that the still uncured adhesive is not readily washed out, as might otherwise occur, for example, if the metal sheets which are provisionally bonded to each other are treated for de-greasing purposes in a wash bath and then in a phosphating bath.

The composition is preferably finally cured in an oven at a temperature which lies clearly above the temperature at which the composition was applied to the parts to be bonded and at or above the temperature at which the curing agent and/or accelerator and/or latent expanding agent (if present) are activated (i.e., in the case of the hardener, the minimum temperature at which the curing agent becomes reactive towards the other components of the adhesive; in the case of the expanding agent, the minimum temperature at which the expanding agent causes foaming or expansion of the adhesive). Curing preferably takes place at a temperature above 150° C., for example at 160 to 190° C., for about 10 to about 60 minutes.

Once cured, the adhesive compositions according to the present invention may be used as casting resins in the electrical or electronics industry or as die attach adhesives in electronics for bonding components to printed circuit boards. Further possible applications for the compositions are as matrix materials for composites, such as fiber-reinforced composites. One particularly preferred application for the adhesives according to the present invention is the formation of structural bonds in vehicle construction such as in hem flanges.

In the embodiment of the invention where the composition includes one or more expanding agents, the adhesive may be utilized to form structural foams which serve to stiffen and reinforce cavities, gaps, structural members and the like. The composition may be supported or contained within a carrier or receptacle or the like so as to position or orient the adhesive such that it expands in one or more particular directions when heated to induce curing and foaming. The composition thus is particularly useful in filling irregularly shaped spaces, as the composition will expand so as to come into contact with a greater portion of the substrate surfaces in the vicinity of the composition than would occur if no expanding agent was present. The foamed, cured composition stiffens and/or increases the energy absorption capacity of vehicle cavities and structural members.

EXAMPLES

Example 1

| Component | Weight % |
| --- | --- |
| Reactive Diluent[1] | 6.5 |
| Epoxy Resin/Core-Shell Rubber Blend[2] | 52.58 |
| Epoxy Resin/Amine-Terminated Polyether Reaction Product[3] | 27.81 |
| Silane[4] | 0.19 |
| Chelate-Modified Epoxy Resin[5] | 0.95 |
| Calcium Oxide | 1.19 |
| Wollastonite Filler[6] | 2.85 |
| Dicyandiamide[7] | 4.27 |
| Hollow Glass Microspheres[8] | 1.87 |
| Polydimethylsiloxane-Treated Fumed Silica[9] | 0.95 |
| Thixotropic Agent[10] | 0.28 |
| Colorant[11] | 0.28 |
| Accelerator[12] | 0.28 |

[1]CARDOLITE LITE 2513 (Cardolite Corporation)
[2]KANEKA ACE MX120 (masterbatch of 25 weight % nano-sized core-shell rubber in a diglycidyl ether of bisphenol A matrix; Kaneka Corporation)
[3]prepared in accordance with U.S. Pat. No. 6,015,865
[4]SILQUEST A-187J gamma-glycidoxypropyltrimethoxysilane (GE Advanced Materials)
[5]Adeka Resin EP-49-10N (epoxy equivalent weight = 225; 100% solids; Asahi Denka)
[6]Nyad 400 WOLLASTOCOAT
[7]AMICURE CG1200 (Air Products)
[8]SCOTCHLITE VS 5500 (3M)
[9]AEROSIL US202 (Cabot)/CABOSIL TS-720 (Degussa)
[10]SYLOTHIX 53 (W. R. Grace)
[11]MONARCH 280 carbon black (Cabot)
[12]AMICURE UR 1,1-dimethyl-3-phenylurea (Air Products)

Examples 2-3

| Component | Ex. 2 (Wt. %) | Ex. 3 (Wt. %) |
| --- | --- | --- |
| Reactive Diluent[1] | 1.03 | 3.70 |
| Epoxy Resin/Core-Shell Rubber Blend[2] | 55.50 | 54.00 |
| Epoxy Resin/Amine-Terminated Polyether Reaction Product[3] | 24.87 | 24.20 |
| Dicyandiamide[4] | 4.62 | 4.50 |
| Mica[5] | 1.03 | 1.00 |
| Wollastonite[6] | 10.28 | 10.00 |
| Polydimethylsiloxane-Treated Fumed Silica[7] | 1.03 | 1.00 |
| Thixotropic Agent[8] | 1.03 | 1.00 |
| Colorant[9] | 0.30 | 0.30 |
| Accelerator[10] | 0.31 | 0.30 |

[1]CARDOLITE LITE 2513 (Cardolite Corporation)
[2]KANEKA ACE MX-120 (masterbatch of 25 weight % nano-sized core-shell rubber in a matrix of bisphenol A diglycidyl ether epoxy resin; Kaneka Corporation)
[3]prepared in accordance with U.S. Pat. No. 6,015,865
[4]AMICURE CG1200 (Air Products)
[5]muscovite 4K mica
[6]Nyad 400 WOLLASTOCOAT
[7]AEROSIL US202 (Cabot)/CABOSIL TS-720 (Degussa)
[8]SYLOTHIX 53 (W. R. Grace)
[9]MONARCH 280 carbon black (Cabot)
[10]AMICURE UR 1,1-dimethyl-3-phenylurea (Air Products)

Example 4

| Component | Weight % |
| --- | --- |
| Epoxy Resin/Amine-Terminated Polyether Reaction Product[1] | 30 |
| Epoxy Resin/Core-Shell Rubber Blend[2] | 50 |
| Epoxy Resin[3] | 10 |
| Reactive Diluent[4] | 4 |
| Dicyandiamide | 4 |
| Fenuron | 0.15 |
| Fumed Silica | 2 |

[1]prepared in accordance with U.S. Pat. No. 6,015,865
[2]KANEKA ACE MX-120 (masterbatch of 25 weight % nano-sized core-shell rubber in a matrix of bisphenol A diglycidyl ether epoxy resin; Kaneka Corporation)
[3]EPON 828 (Resolution Performance Products)
[4]CARDOLITE NC513 (Cardolite Corporation)

Example 5

| Component | Weight % |
| --- | --- |
| Reactive Diluent[1] | 6.5 |
| Epoxy Resin/Core-Shell Rubber Blend[2] | 54 |
| Epoxy Resin/Amine-Terminated Polyether Reaction Product[3] | 26.8 |
| Silane[4] | 0.2 |
| Calcium Oxide | 1.5 |
| Wollastonite Filler[5] | 3 |
| Dicyandiamide[6] | 4.5 |
| Hollow Glass Microspheres[7] | 1.8 |
| Rheology Control Agent[8] | 1 |
| Thixotropic Agent[9] | 0.3 |
| Colorant[10] | 0.1 |
| Accelerator[11] | 0.3 |

[1]CARDOLITE LITE 2513 (Cardolite Corporation)
[2]masterbatch of 25 weight % nano-sized core-shell rubber in a matrix of bisphenol A diglycidyl ether epoxy resin, with the core being predominately a polybutadiene/styrene copolymer (Kaneka Corporation)
[3]prepared in accordance with U.S. Pat. No. 6,015,865
[4]SILQUEST A-187J gamma-glycidoxypropyltrimethoxysilane (GE Advanced Materials)
[5]Nyad 400 WOLLASTOCOAT
[6]AMICURE CG1200 (Air Products)
[7]SCOTCHLITE VS 5500 (3M)
[8]GARAMITE 1958 (described by the supplier, Southern Clay Products, as an organically modified silicate or mixed mineral thixotrope)
[9]SYLOTHIX 53 (W. R. Grace)
[10]MONARCH 280 carbon black (Cabot)
[11]AMICURE UR 1,1-dimethyl-3-phenylurea (Air Products)

The following testing was carried out on various of the samples cured for 30 minutes at 180° C.:
180 Degree Tensile Peel
ASTM D1876
Specimens: Grit Blasted Mild Steel (GBMS), 1.00 mm substrate thickness
Bondline: 0.25 mm
Testing Rate: 200 mm/min
Test Temperature Ambient, 0, −10, −20, −30, −40° C.
Tensile Lap Shear
ASTM D1002
Specimens: Grit Blasted Mild Steel (GBMS), 1.6 mm substrate thickness
Bondline: 0.25 mm
Testing Rate: 10 mm/min
Test Temperature Ambient
Wedge Impact
ISO 11343 methodology
Specimens: Grit Blasted Mild Steel (GBMS), 0.8 mm substrate thickness
Bondline: 0.25 mm
Test Temperature Ambient, −18, −19, −25° C. and 23, −20, −40° C.
DMTA
Test Temperature: −50 to 200° C.

The tensile peel strength of the composition of Example 4 actually increased at lower temperatures. That is, the adhesive exhibited excellent retention of peel properties even at −30 and −40° C. This result was unexpected, as commercial epoxy-based adhesives containing both amine-terminated polyether/epoxy resin reaction products and adducts of epoxy resins with CTBN showed significant declines in tensile peel strength at temperatures below −30° C. An adhesive containing rubber particles having a core-shell structure as the sole toughener (i.e., an adhesive that did not contain any amine-terminated polyether/epoxy resin reaction product) exhibited a lower tensile peel strength at ambient temperatures, with the tensile peel strength decreasing still further at lower temperatures (below −10° C.).

The composition of Example 4 had a tensile lap shear value of 35.7 N/mm$^2$ and retained about 60% of its dynamic resistance to cleavage (wedge impact) properties over the temperature range of ambient to −25° C. In contrast, two commercial epoxy-based adhesives containing both amine-terminated polyether/epoxy resin toughener and epoxy resin/CTBN adduct toughener retained only about 2 to about 6 percent of their dynamic resistance to cleavage properties over the same temperature range.

The glass transition temperature of the composition of Example 4, when cured, was 150° C., as measured by DTMA. The composition exhibited a modulus of 1.14 GPa at −40° C.

The composition of Example 5 exhibits an impact peel strength at 23, −20, and −40° C. of 32.5, 33 and 26.5 N/mm, respectively.

Examples 6-21

Further embodiments of the present invention are illustrated by Examples 6-21, wherein two different types of rubber particles having core-shell structures are used in combination with several different types of auxiliary impact modifiers/toughening agents. In addition to the components listed in Table 1 (the amounts of which are expressed in parts by weight), each of the example compositions contained 4 parts by weight (pbw) CARDOLITE LITE-2513 HP reactive diluent (Cardolite Corporation), 2 pbw fumed silica, 4 pbw dicyandiamide, and 0.15 pbw fenuron. The compositions were cured at 180° C. for 30 minutes and tested in accordance with the following protocols:
180 Degree Tensile Peel
Specimens: Acetone-wiped mild steel (MS), 0.8 mm substrate thickness
Bondline: 0.25 mm
Testing Rate: 200 mm/min
Test Temperature Ambient
Wedge Impact
ISO 11343 methodology
Specimens: Acetone-wiped mild steel (MS), 0.8 mm substrate thickness
Bondline: 0.25 mm
Test Temperature Ambient and −40° C.

The formulations of Examples 6, 8, 9, 13-18 and 20-21 exhibited particularly high impact strength at room temperature, while the formulations of Examples 14 and 15 also had particularly high impact strength at −40° C.

TABLE 1

| Component | Ex. 6 | Ex. 7 | Ex. 8 | Ex. 9 | Ex. 10 | Ex. 11 | Ex. 12 | Ex. 13 | Ex. 14 |
|---|---|---|---|---|---|---|---|---|---|
| Core-Shell Rubber A[1] | 50 | 50 | 50 | 50 | 50 | 50 | 50 | 50 | — |
| Core-Shell Rubber B[2] | — | — | — | — | — | — | — | — | 50 |
| Epoxy Resin[3] | 10 | 10 | 10 | — | 10 | 10 | 10 | 10 | 10 |
| Aux. Impact Modifier A[4] | 30 | — | — | — | — | — | — | — | 30 |
| Aux. Impact Modifier B[5] | — | 30 | — | — | — | — | — | — | — |
| Aux. Impact Modifier C[6] | — | — | 30 | — | — | — | — | — | — |
| Aux. Impact Modifier D[7] | — | — | — | 40 | — | — | — | — | — |
| Aux. Impact Modifier E[8] | — | — | — | — | 30 | — | — | — | — |
| Aux. Impact Modifier F[9] | — | — | — | — | — | 30 | — | — | — |
| Aux. Impact Modifier G[10] | — | — | — | — | — | — | 30 | — | — |
| Aux. Impact Modifier H[11] | — | — | — | — | — | — | — | 30 | — |
| T Peel, 200 mm/min, Mild Steel, N/mm | 11.3 | 2.4 | 16.4 | 16.7 | 13.5 | 0.0 | 9.1 | 13.6 | 16.8 |
| Wedge Impact @ R.T., N/mm | 31.8 | 11.7 | 32.2 | 31.8 | 7.9 | 0.9 | 1.3 | 30.5 | 37.0 |
| Wedge Impact @ −40° C., N/mm | 1.1 | 1.7 | 3.5 | 1.3 | 0.0 | — | — | 1.1 | 20.6 |

| Component | Ex. 15 | Ex. 16 | Ex. 17 | Ex. 18 | Ex. 19 | Ex. 20 | Ex. 21 |
|---|---|---|---|---|---|---|---|
| Core-Shell Rubber A[1] | — | — | — | — | — | — | — |
| Core-Shell Rubber B[2] | 50 | 50 | 50 | 50 | 50 | 50 | 50 |
| Epoxy Resin[3] | 10 | 10 | — | 10 | 10 | 10 | 10 |
| Aux. Impact Modifier A[4] | — | — | — | — | — | — | — |
| Aux. Impact Modifier B[5] | 30 | — | — | — | — | — | — |
| Aux. Impact Modifier C[6] | — | 30 | — | — | — | — | — |
| Aux. Impact Modifier D[7] | — | — | 40 | — | — | — | — |
| Aux. Impact Modifier E[8] | — | — | — | 30 | — | — | — |
| Aux. Impact Modifier F[9] | — | — | — | — | 30 | — | — |
| Aux. Impact Modifier G[10] | — | — | — | — | — | 30 | — |
| Aux. Impact Modifier H[11] | — | — | — | — | — | — | 30 |
| T Peel, 200 mm/min, Mild Steel, N/mm | 4.2 | 14.2 | 17.9 | 12.5 | 0.0 | 11.8 | 14.9 |
| Wedge Impact @ R.T., N/mm | 27.2 | 36.0 | 30.3 | 37.1 | 0.0 | 27.7 | 36.3 |
| Wedge Impact @ −40° C., N/mm | 9.8 | 2.5 | 1.2 | 0.6 | — | 1.2 | 2.6 |

[1] KANEKA ACE MX-120 (Kaneka Corporation)
[2] KANEKA ACE MX-156 (Kaneka Corporation)
[3] EPON 828 (Resolution Performance Products)
[4] Epoxy resin/amine-terminated polyether reaction product prepared in accordance with U.S. Pat. No. 6,015,865
[5] Prepared in accordance with Example 1 of Canadian Pat. Application No. 2,510,486 (polytetrahydrofuran diol capped with isophorone diisocyanate and then further reacted with trimethylolpropane diglycidyl ether)
[6] Prepared in accordance with Prepolymer 1A as described in U.S. Pat. No. 5,278,257 (polypropylene glycol capped with hexamethylene diisocyanate and then further reacted with diallylbisphenol A)
[7] NANOSTRENGTH E21 polystyrene-polybutadiene-polymethylmethacrylate block copolymer, 20 weight % in EPON 828 epoxy resin (Arkema)
[8] DYNACOLL 7210 liquid linear polyester having primary hydroxyl functionality and medium molecular weight (Degussa)
[9] POLYVEST OC800 maleic anhydride adduct of low molecular weight 1,4-cis-polybutadiene (Degussa)
[10] THIOPLAST EP350 mixture of bisphenol A epoxy resin and bisphenol F epoxy resin with ca. 40% epoxy-terminated liquid polysulfide (Akzo Nobel)
[11] HYPOX DA323 dimer acid-modified epoxy resin (CVC Specialty Chemical)

What is claimed is:

1. A composition comprising:
   A) at least one epoxy resin;
   B) rubber particles having a core-shell structure;
   C) at least one auxiliary impact modifier/toughening agent;
   D) at least one heat-activated latent curing agent;
   additionally comprising at least one filler selected from the group consisting of platy fillers, hollow glass microspheres and combinations thereof.

2. A composition comprising:
   A) at least one epoxy resin;
   B) rubber particles having a core-shell structure;
   C) at least one auxiliary impact modifier/toughening agent;
   D) at least one heat-activated latent curing agent;
   additionally comprising at least one chelate-modified epoxy resin.

3. A composition of comprising:
   A) at least one epoxy resin;
   B) rubber particles having a core-shell structure;
   C) at least one auxiliary impact modifier/toughening agent;
   D) at least one heat-activated latent curing agent;
   comprising from about 0.1 to about 3 weight percent of at least one chelate-modified epoxy resin.

4. A composition comprising:
   A) at least one epoxy resin;
   B) rubber particles having a core-shell structure;
   C) at least one auxiliary impact modifier/toughening agent;
   D) at least one heat-activated latent curing agent;
   comprising at least one substituted guanidine heat-activated latent curing agent.

5. A composition comprising:
   A) at least one epoxy resin;
   B) rubber particles having a core-shell structure;
   C) at least one auxiliary impact modifier/toughening agent;
   D) at least one heat-activated latent curing agent;
   wherein said rubber particles have an average diameter of from about 25 to about 200 nm.

6. A composition comprising:
   A) at least one epoxy resin;
   B) rubber particles having a core-shell structure;
   C) at least one auxiliary impact modifier/toughening agent;
   D) at least one heat-activated latent curing agent;
   wherein the weight ratio of epoxy resin:combined weight of auxiliary impact modifier/toughener and rubber particles having a core-shell structure is from about 0.2:1 to about 3:1.

7. A composition comprising:
   A) at least one epoxy resin;
   B) rubber particles having a core-shell structure;
   C) at least one auxiliary impact modifier/toughening agent;
   D) at least one heat-activated latent curing agent;
   wherein the weight ratio of auxiliary impact modifier/toughener:rubber particles is from about 0.2:1 to about 5:1.

8. A composition comprising:
   A) at least one epoxy resin;
   B) rubber particles having a core-shell structure;
   C) at least one auxiliary impact modifier/toughening agent;
   D) at least one heat-activated latent curing agent;
   additionally comprising at least one reactive diluent which is a mono-epoxide.

9. A composition comprising:
   A) at least one epoxy resin;
   B) rubber particles having a core-shell structure;
   C) at least one auxiliary impact modifier/toughening agent;
   D) at least one heat-activated latent curing agent;
   comprising from about 25 to about 55 weight percent epoxy resin, from about 5 to about 40 weight percent auxiliary impact modifier/toughener, and from about 5 to about 25 weight percent rubber particles having a core-shell structure, wherein the weight ratio of epoxy resin:combined weight of auxiliary impact modifier/toughener and rubber particles having a core-shell structure is from about 0.2:1 to about 3:1 and the weight ratio of auxiliary impact modifier/toughener:rubber particles is from about 0.2:1 to about 5:1.

10. A composition comprising:
    A) at least one epoxy resin;
    B) rubber particles having a core-shell structure;
    C) at least one auxiliary impact modifier/toughening agent;
    D) at least one heat-activated latent curing agent;
    wherein at least a portion of the rubber particles having a core-shell structure have an average diameter of from about 25 to about 200 nm and are stably dispersed in a masterbatch comprised of epoxy resin when combined with the other components of the composition, with said rubber particles having a core comprised of a polymer or copolymer of 1,4-butadiene having a glass transition temperature of not greater than −40° C.

* * * * *